United States Patent
Tang et al.

(10) Patent No.: US 11,312,007 B2
(45) Date of Patent: Apr. 26, 2022

(54) SERPENTINE INSPECTION ROBOT MECHANISM FOR LIFTING CAGE GUIDE DRIVEN BY MAGNETIC WHEELS

(71) Applicant: China University of Mining and Technology, Xuzhou (CN)

(72) Inventors: Chaoquan Tang, Xuzhou (CN); Gongbo Zhou, Xuzhou (CN); Eryi Hu, Xuzhou (CN); Hua Zhu, Xuzhou (CN); Bi Ma, Xuzhou (CN); Xin Shu, Xuzhou (CN); Jian Zhao, Xuzhou (CN); Xin Chen, Xuzhou (CN); Chusheng Liu, Xuzhou (CN)

(73) Assignee: China University of Mining and Technology

( * ) Notice: Subject to any disclaimer, the term of this patent is extended or adjusted under 35 U.S.C. 154(b) by 856 days.

(21) Appl. No.: 16/095,717

(22) PCT Filed: Jun. 23, 2017

(86) PCT No.: PCT/CN2017/089815
§ 371 (c)(1),
(2) Date: Oct. 23, 2018

(87) PCT Pub. No.: WO2018/214217
PCT Pub. Date: Nov. 29, 2018

(65) Prior Publication Data
US 2021/0078165 A1    Mar. 18, 2021

(30) Foreign Application Priority Data
May 24, 2017  (CN) .......................... 201710374286.3

(51) Int. Cl.
B25J 9/06    (2006.01)
B25J 5/00    (2006.01)
B25J 9/10    (2006.01)

(52) U.S. Cl.
CPC ............... B25J 9/065 (2013.01); B25J 5/007 (2013.01); B25J 9/102 (2013.01)

(58) Field of Classification Search
CPC ............. B25J 9/102; B25J 5/007; B25J 9/065
See application file for complete search history.

(56) References Cited

FOREIGN PATENT DOCUMENTS

CN           105710887 B   *   2/2018

* cited by examiner

*Primary Examiner* — Randell J Krug

(57) ABSTRACT

The invention relates to a serpentine inspection robot mechanism for lifting cage guide driven by magnetic wheels, comprising a magnetic wheel drive part and a pitching yawing part, wherein the magnetic wheel drive part comprises a worm and gear transmission mechanism (I) and a magnetic wheel driving mechanism (II), and the pitching yawing part comprises a pitching yawing mechanism (III). Magnetic wheels are driven by the worm and gear transmission mechanism (I) and the magnetic wheel driving mechanism (II), while the pitching and yawing control of the robot are realized by the pitching yawing mechanism (III). The serpentine robot driven by the magnetic wheels (22) resolves the problems that the efficiency of ordinary serpentine robot is low, and it is difficult for the simple-wheel-type robot to span the large gap and to reach some concealed corners, with the cage guide of the lifting machine sucked by the magnetic wheels (22).

3 Claims, 3 Drawing Sheets

US 11,312,007 B2

SERPENTINE INSPECTION ROBOT MECHANISM FOR LIFTING CAGE GUIDE DRIVEN BY MAGNETIC WHEELS

FIELD OF THE INVENTION

This invention relates to a robot mechanism and more particularly, to a serpentine inspection robot mechanism for lifting cage guide driven by magnetic wheels applied for the detection and maintenance of the cage guide of the mine lifting machine.

BACKGROUND OF THE INVENTION

The mine lifting machine is used primarily for the mine car scheduling and other auxiliary traction under the mine pit, and also used for the consignment and lifting or other auxiliary transportation operations in the sites like coal mine pit, metallurgical mines and construction sites, but manned-use is prohibited.

As the detection and maintenance method of the mine lifting machine is outdated currently, it is the hoist or other lifting devices that are generally used to be arranged on the manned platform to do manual inspection, thus the risk increased. An inspection robot assisting workers to inspect need to be designed because the manual detection and maintenance for the device status of the mine lifting machine is less efficient, the working condition is hostile and there is a certain risk. A serpentine inspection robot mechanism driven by magnetic wheels for the multidimensional inspections on the cage guide of the lifting machine has been designed, because the rail gap of the cage guide environment is large, it is hard for the ordinary wheel-type robot to span the large gap, and it needs to be observed from various perspectives during the inspection.

SUMMARY OF THE INVENTION

This invention is aimed to provide a serpentine inspection robot mechanism for lifting cage guide driven by magnetic wheels applied for the detection and maintenance of the cage guide of the mine lifting machine to resolve the problems that there are some defects in the prior experimental models above.

The objective of the invention is implemented through the technical proposal as follows:

A serpentine inspection robot mechanism for lifting cage guide driven by magnetic wheels, comprising a magnetic wheel drive part and a pitching yawing part, wherein the magnetic wheel drive part comprises a worm and gear transmission mechanism and a magnetic wheel driving mechanism, and the pitching yawing part comprises a pitching yawing mechanism;

The worm and gear transmission mechanism comprises a worm I, turbines, a synchronous pulley I, a synchronous pulley II, a plum coupling, a steering engine I and a synchronous pulley, wherein a plurality of the turbines are distributed around the worm I, the steering engine I, the plum coupling, the worm I, the turbines, the synchronous pulley I, the synchronous pulley II and the synchronous belt are connected successively, and the bearing I is engaged to the worm I;

The magnetic wheel driving mechanism comprises spur gears, spur gears and magnetic wheels, wherein the spur gears is connected to a combination formed by spur gears V and the two magnetic wheels; the bearing IV is engaged to the spur gears V and the magnetic wheels, and the magnetic wheels are arranged at both sides of the spur wheel V;

The pitching yawing mechanism comprises a steering engine II, spur gears IV, spur gears III, spur gears III, a bevel gear II, a bevel gear I and a joint, wherein the steering engine II, the spur gears IV, the spur gears III, the spur gears III, the bevel gears II, the bevel gears I and the joint are connected successively.

Further, the worm I, the turbine, the synchronous pulley I, the synchronous pulley II and the magnetic wheel are all fixed on the two bottom plates which are arranged between the worm and gear transmission mechanism and the magnetic wheel driving mechanism, and between the magnetic wheel driving mechanism and the pitching yawing mechanism; the steering engine I is fixed on the magnetic wheel driving mechanism, and the steering engine II is fixed on the pitching yawing mechanism.

Further, the spur gears IV are arranged in two rows in the up-to-down direction.

Advantageous effects of the invention: the serpentine robot driven by the magnetic wheels resolves the problems that the efficiency of ordinary serpentine robot is low, and it is difficult for the simple-wheel-type robot to span the large gap and to reach some concealed corners, with the cage guide of the lifting machine sucked by the magnetic wheels, makes the magnetic-adsorption area larger, operation more stable, and movement more flexible, with the adoption of the worm and gear mechanism, surrounded by three or more turbines and the same amount of magnetic wheels.

In the figures, 1 refers to the bearing I; 2 refers to the worm I; 3 refers to turbines; 4 refers to the synchronous pulley I; 5 refers to the bearing II; 6 refers to the plum coupling; 7 refers to the spur gears I; 8 refers to the synchronous pulley II; 9 refers to the steering engine I; 10 refers to the steering engine II; 11 refers to the side panel; 12 refers to the joint; 13 refers to the bevel gears I; 14 refers to the cross shaft; 15 refers to the bevel gear II; 16 refers to the spur gears II; 17 refers to the spur gears III; 18 refers to the spur gears IV; 19 refers to the bearing III; 20 refers to the bearing IV; 21 refers to the the spur gears V; 22 refers to the magnetic wheels; 23 refers to the synchronous pulley; I refers to the worm and gear transmission mechanism; II refers to the magnetic wheel driving mechanism; III refers to the pitching yawing mechanism.

DETAILED DESCRIPTION

Combined with the accompanying drawings, the detailed description of the invention is described as following.

The following is the detailed description of the invention; those skilled in the art can understand the advantages and effects of the invention according to what have been disclosed in this description. This invention can be implemented or applied through other different detailed description; details in this description can be based on different researches and application, and various modifications may be made without departing from the spirit of the invention.

Figure 1:
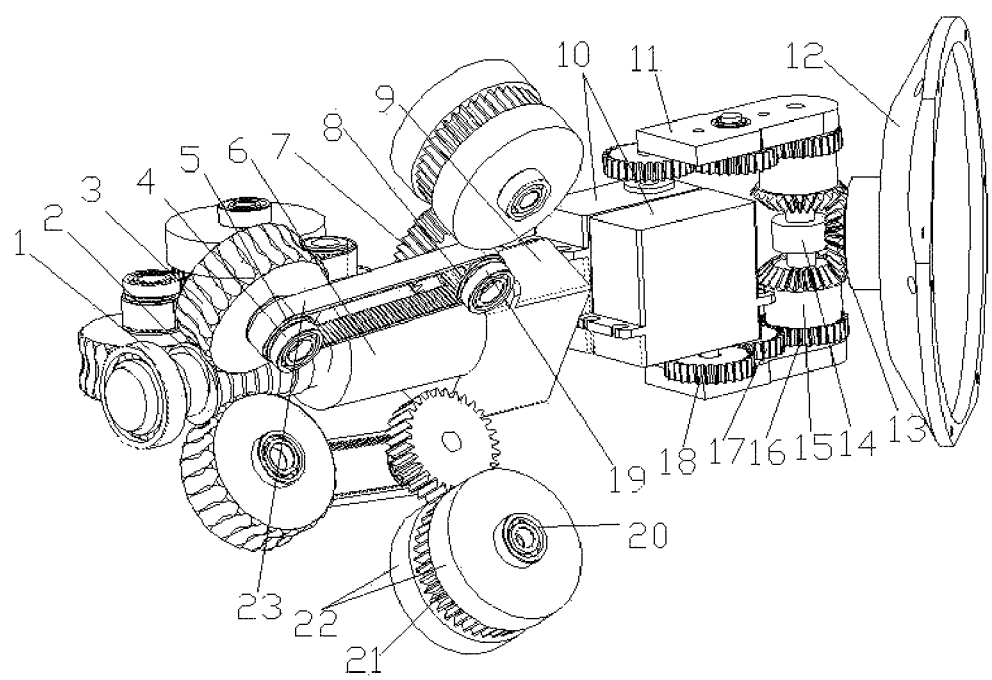
FIG. 1 is the partial structural diagram I of the invention.
Figure 2:
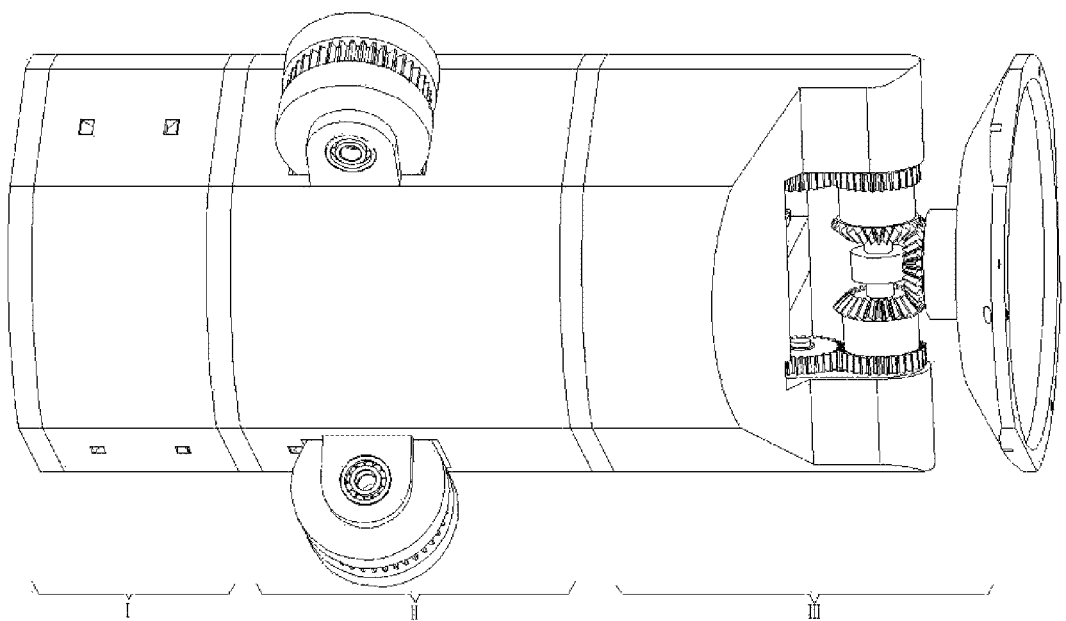
FIG. 2 is the partial structural diagram II of the invention.

A serpentine inspection robot mechanism for lifting cage guide driven by magnetic wheels, as is shown in FIG. 1 and FIG. 2, comprising a magnetic wheel drive part and a pitching yawing part, wherein the magnetic wheel drive part comprises a worm and gear transmission mechanism I and a magnetic wheel driving mechanism II, and the pitching yawing part comprises a pitching yawing mechanism III; the said worm and gear transmission mechanism comprises a worm I 2, turbines 3, a synchronous pulley I 4, a synchronous pulley II 8, a plum coupling 6, a steering engine I 9 and a synchronous pulley 23, wherein a plurality of the turbines 3 are distributed around the worm I 2, the steering engine I 9, the plum coupling 6, the worm I 2, the turbines 3, the synchronous pulley I 4, the synchronous pulley II 8 and the synchronous belt 23 are connected successively, and the bearing I 1 is engaged to the worm I 1; the said magnetic wheel driving mechanism comprises spur gears 7, spur gears 21 and magnetic wheels 22, wherein the spur gears 7 is connected to a combination formed by spur gears V 21 and the two magnetic wheels 22; the bearing IV 20 is engaged to the spur gears V 21 and the magnetic wheels 22, and the magnetic wheels 22 are arranged at both sides of the spur wheel V 21;

The torque generated by the steering engine I 9 is transmitted to the the worm I 2 through the plum coupling 6, then to turbines 3; the turbines 3 drives the the synchronous pulley I 4 to transmit the torque to the magnetic wheel driving mechanism II through the synchronous pulley I 4, the synchronous pulley II 8 and the the synchronous pulley 23, then to the the magnetic wheels 22 through the the spur gears I 7 and the spur gears V 21.

The pitching yawing mechanism comprises a steering engine II 10, spur gears IV 18, spur gears III 17, spur gears II 16, a bevel gear II 15, a bevel gear I 13 and a joint 12, wherein the steering engine II 10, the spur gears IV 18, the spur gears III 17, the spur gears II 16, the bevel gears II 15, the bevel gears I 13 and the joint 12 are connected successively.

Figure 3:
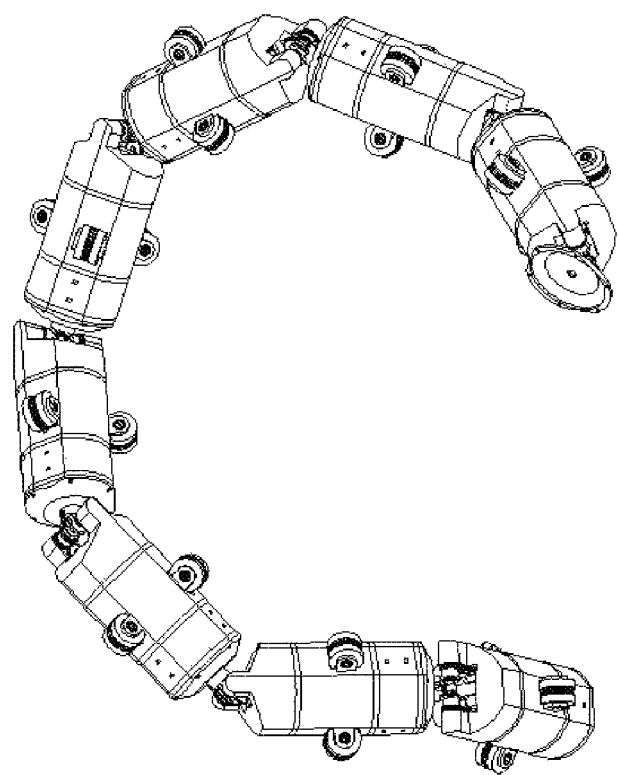
FIG. 3 is the overall structural diagram of the invention.

The torque generated by the the steering engine II 10 transmit the force to the two rows of bevel gears II 15 in the up-to-down direction through the spur gears IV 18, the spur gears III 17, and the spur gears II 16 in two rows in the up-to-down direction; when the steering engine I 9 rotates at the same speed as the the steering engine II 10, the force is transmitted to the next section through the bevel gears I 13 and the joint 12 to realize the pitching control of the serpentine robot, as is shown in FIG. 3; while when the rotation speeds are different, the force is transmitted to the next section through the bevel gears I 13 and the joint 12 to realize the yawing control of the serpentine robot. The magnetic wheels 22 is sucked on the cage guide of the lifting machine, the torque generated by the steering engine overcomes various resistance between the parts to drive the magnetic wheels, so as to make the serpentine robot creep. Meanwhile, the direction of the serpentine robot is controlled by the pitching yawing mechanism III, so that various gestures of creeping are realized.

The present robot mechanism comprises several sections of inspection mechanisms, namely, the worm and gear transmission mechanism I, the magnetic wheel driving mechanism II, and the pitching yawing mechanism III, wherein the magnetic wheels are driven by the worm and gear transmission mechanism I and the magnetic wheel driving mechanism II, while the pitching and yawing control of the robot are realized by the pitching yawing mechanism III. Accordingly, the serpentine robot is sucked on the cage guide of the lifting machine with the suction of the magnetic wheels, and the magnetic wheels are driven by the steering engine to overcome various resistance, so as to move forward; while the swing and the movement direction of the serpentine robot is realized by the pitching yawing mechanism III; the pitching and yawing movement required are realized by the steering engine I 9 and the steering engine II 10.

The above description is to illustrate the principles and effects of the invention, and is not intended to limit the present invention. Various modifications on the details of the invention may be made by any person skilled in the art without departing from the spirit and scope of the invention. Thus, all equivalent changes or modifications that do not depart from the spirit disclosed in the invention in any fields should fall within the extent of protection of the present invention.

The invention claimed is:

1. A robot mechanism, comprising
a magnetic wheel drive part and a pitching yawing part,
wherein the magnetic wheel drive part comprises a worm and gear transmission mechanism and a magnetic wheel driving mechanism;
wherein the pitching yawing part comprises a pitching yawing mechanism;
wherein the worm and gear transmission mechanism comprises
a worm (2),
a plurality of turbines (3),
a first synchronous pulley (4),
a second synchronous pulley (8),
a plum coupling (6),
a first steering engine (9) and
a synchronous belt (23),
wherein the plurality of the turbines (3) are distributed around the worm (2),
wherein the first steering engine (9), the plum coupling (6), the worm (2), the plurality of turbines (3), the first synchronous pulley (4), the synchronous belt (23) and the second synchronous pulley (8) are connected, and
wherein a first bearing (1) is engaged to the worm (2);
wherein the magnetic wheel driving mechanism comprises:
first spur gears (7),
second spur gears (21) and
two magnetic wheels (22),
wherein the first spur gears (7) are connected to a combination formed by the second spur gears (21) and the two magnetic wheels (22);
wherein a second bearing (20) is engaged to the second spur gears (21) and the two magnetic wheels (22), and
wherein the two magnetic wheels (22) are arranged at both sides of the second spur gears (21);
wherein the pitching yawing mechanism comprises:
a pair of second steering engines (10),
third spur gears (18),
fourth spur gears (17),
fifth spur gears (16),
a plurality of first bevel gears (15),
a plurality of second bevel gears (13) and
a joint (12),
wherein the second steering engines (10), the third spur gears (18), the fourth spur gears (17), the fifth spur gears (16), the first bevel gears (15), the second bevel gears (13), and the joint (12) are connected, respectively.

2. The robot mechanism according to claim 1, wherein the first steering engine (9) is fixed on the magnetic wheel driving mechanism, and wherein the second steering engines (10) are fixed on the pitching yawing mechanism.

3. The robot mechanism according to claim 1, wherein the third spur gears (18) are arranged in two rows in an up-to-down direction.

\* \* \* \* \*